United States Patent  
Guala et al.

(10) Patent No.: US 11,493,088 B2
(45) Date of Patent: Nov. 8, 2022

(54) GREASE DISPENSING DEVICE FOR ROLLING BEARINGS

(71) Applicant: Aktiebolaget SKF, Gothenburg (SE)

(72) Inventors: Giuseppe Guala, Pinerolo (IT); Luca Morero, Piossasco (IT); Massimiliano Ribet, Pomaretto (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 17/238,971

(22) Filed: Apr. 23, 2021

(65) Prior Publication Data

US 2021/0332851 A1 Oct. 28, 2021

(30) Foreign Application Priority Data

Apr. 28, 2020 (IT) .................. 102020000009133

(51) Int. Cl.
  *F16C 33/66* (2006.01)
  *F16C 19/38* (2006.01)

(52) U.S. Cl.
  CPC ........ *F16C 33/6614* (2013.01); *F16C 19/385* (2013.01); *F16C 33/6622* (2013.01); *F16C 33/6629* (2013.01)

(58) Field of Classification Search
  CPC .. F16C 19/385; F16C 19/386; F16C 33/6603; F16C 33/6607; F16C 33/6614; F16C 33/6622; F16C 33/6625; F16C 33/6629
  See application file for complete search history.

(56) References Cited

U.S. PATENT DOCUMENTS

| 4,472,004 A | * | 9/1984 | Fingerle | F16C 33/6607 |
| | | | | 384/463 |
| 4,541,740 A | * | 9/1985 | Schard | F16C 33/6622 |
| | | | | 384/473 |
| 5,803,616 A | * | 9/1998 | Persson | F16C 33/6614 |
| | | | | 384/473 |
| 2019/0010988 A1 | * | 1/2019 | Ribet | F16C 33/6629 |

FOREIGN PATENT DOCUMENTS

| CN | 111637156 A | * | 9/2020 | |
| DE | 3008636 | | 9/1980 | |
| DE | 102008025568 | | 12/2009 | |
| WO | WO-2009144075 A1 | * | 12/2009 | ............ F16C 19/364 |
| WO | 2016096918 | | 6/2016 | |

OTHER PUBLICATIONS

Search Report for corresponding Italy Patent Application No. 102020000009133 dated Dec. 16, 2020.

* cited by examiner

*Primary Examiner* — Alan B Waits
(74) *Attorney, Agent, or Firm* — Reed Smith LLP

(57) ABSTRACT

A rolling bearing unit provided with a radially outer ring having an assembly groove, two radially inner rings, two series of rolling elements interposed between the radially outer ring and the radially inner rings and defining between them a first internal grease reservoir. The groove is arranged in an axially intermediate position with respect to the two radially inner rings and a grease dispensing device is housed inside the groove of the radially outer ring and is in turn provided with a second grease reservoir formed inside the radially outer ring and communicating with the first reservoir via the groove. A permeable retaining wall housed is inside the groove so as to retain the grease inside the second reservoir and allow it to flow out towards the first reservoir during operation of the bearing unit, dispensing it in a controlled manner.

6 Claims, 2 Drawing Sheets

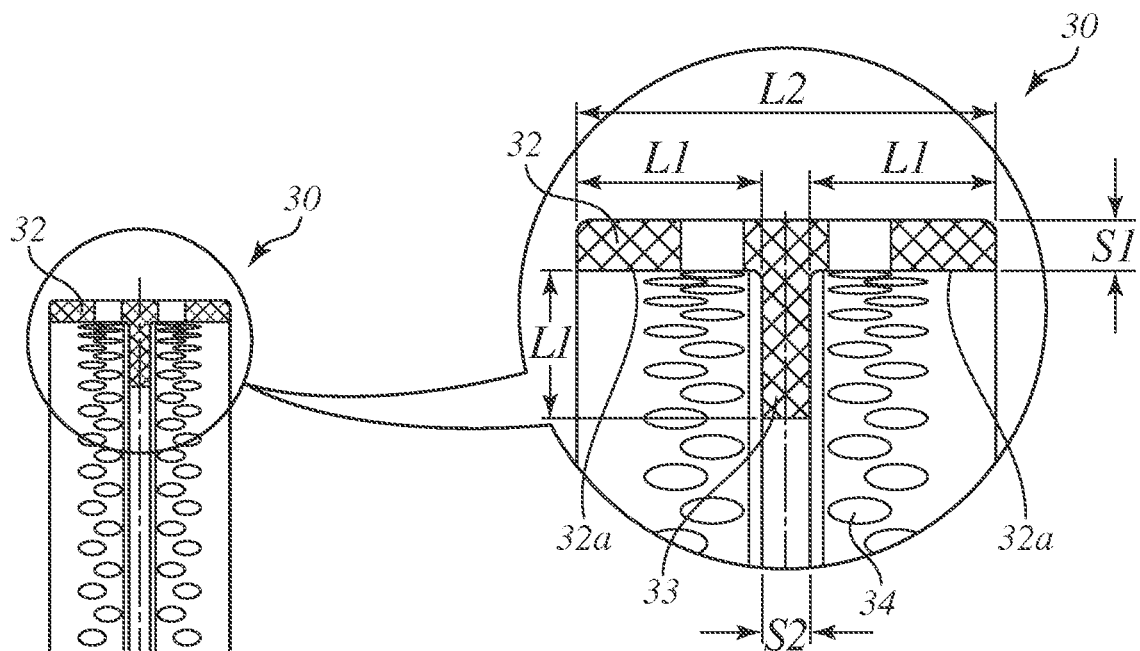
FIG. 3
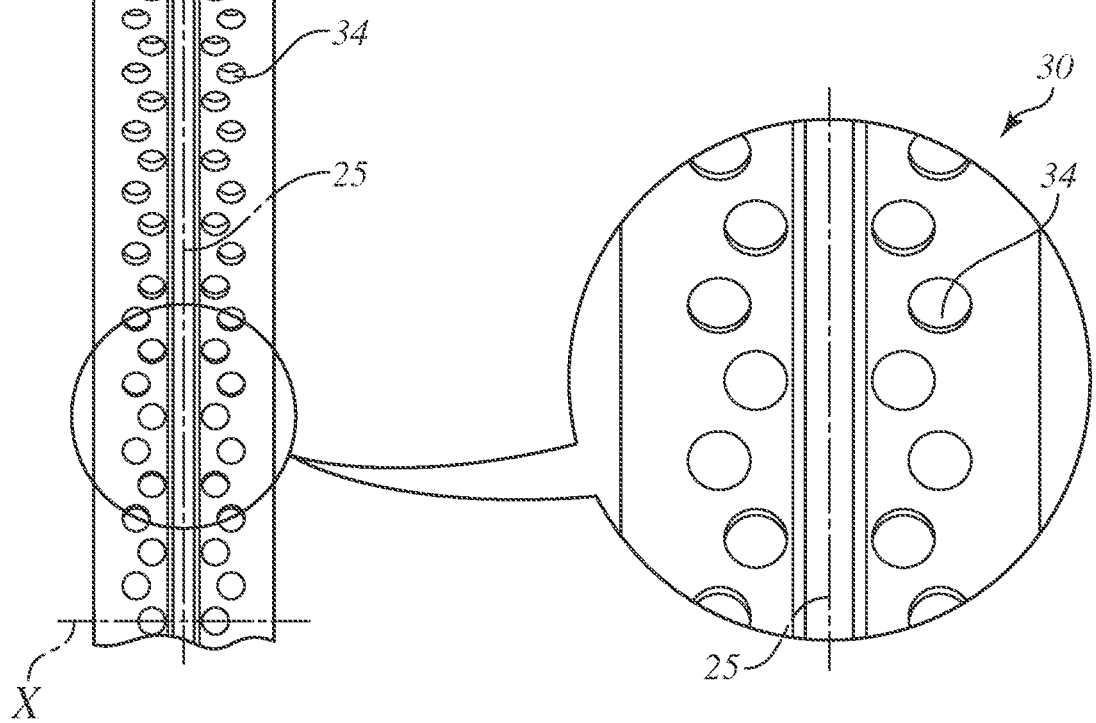
FIG. 2
FIG. 4

GREASE DISPENSING DEVICE FOR ROLLING BEARINGS

CROSS-REFERENCE RELATED APPLICATION

This application is based on and claims priority to Italian Patent Application No. 102020000009133 filed on Apr. 28, 2020, under 35 U.S.C. § 119, the disclosure of which is incorporated by reference herein.

FIELD

The present disclosure relates to a grease dispensing device for a rolling bearing. More particularly, the device is suitable for retaining the grease and then dispensing it during the working cycle of the bearing.

BACKGROUND

Rolling bearing may require suitable lubrication during the operating conditions of its life cycle. Typically the types of grease used are based on mineral oil thickened with lithium soap, which has a good thermal stability, oxidation resistance and mechanical strength as well as excellent water-resistant and anti-rust properties.

BRIEF DESCRIPTION OF THE DRAWINGS

Embodiments of the disclosure will now be described with reference to the accompanying drawings which illustrate a non-limiting example of embodiment thereof, in which:

FIG. 2 is a view, axially sectioned and on a larger scale, of a detail of FIG. 1; and FIGS. 3 and 4 show, on a larger scale, two close-ups of the detail of FIG. 2.

DETAILED DESCRIPTION

Figure 1:
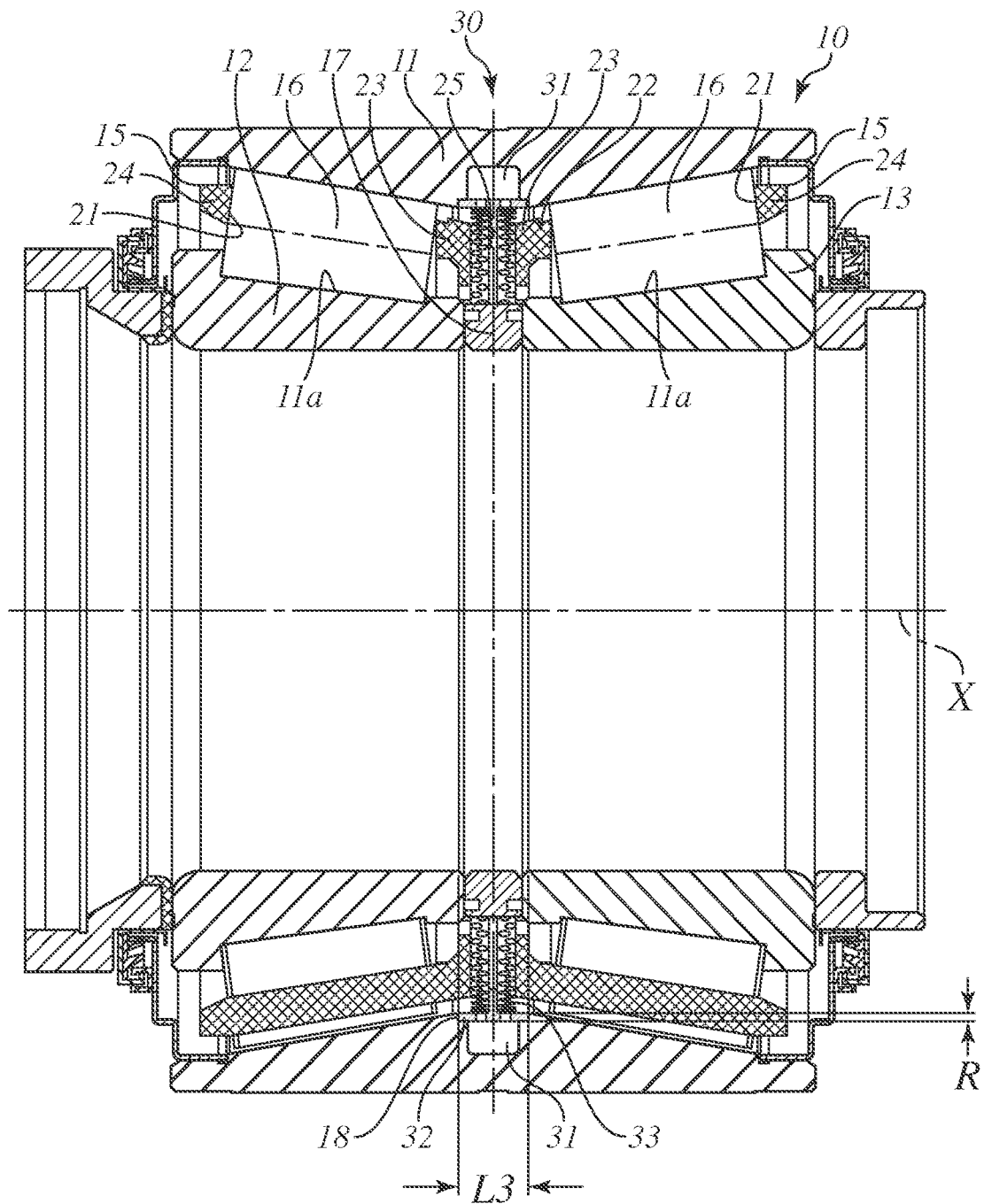
FIG. 1 is an axially sectioned view of a bearing with a double row of rollers, provided with a preferred embodiment of a grease dispensing device according to the present disclosure.

In the case of bearings with a double row of rolling elements, grease is inserted inside the central zone between the two rows. During the operating condition of the bearing, the grease migrates between the various parts of the bearing in an entirely random manner, owing to many factors, most of which cannot be controlled. The result is that often some zones requiring greater lubrication receive small amounts of grease and tend to wear more quickly, while on the other hand the grease accumulates in zones requiring less lubrication, resulting in undesirable leakages due to friction.

Grease dispensing devices or lubricating cartridges are known where the aim is to retain the grease, creating a kind of obstacle to the free outflow thereof, and to dispense it in a sufficiently controlled manner during operation of the bearing. For example, the document U.S. Pat. No. 5,803,616 describes a grease dispensing device mounted on the outer ring of the bearing, interposed between two rows of tapered rollers and having a central annular reservoir delimited axially by a honeycomb structure which, while on the one hand it is able to retain effectively the grease and on the other hand allows dispensing of the grease, must not only be subject to the action of a centrifugal force, but also occupies a considerable amount of axial space between the two rows of tapered rollers, thereby greatly limiting its field of application.

Embodiments of the disclosure provide a grease dispensing device which overcomes the drawbacks of the known devices.

With reference to FIG. 1, 10 denotes in its entirety an exemplary bearing unit which has an axis X of rotation and includes a stationary outer ring 11, a pair of rotating inner rings 12, 13 arranged axially in series along the axis X radially on the inside of the outer ring 11, a double series of rolling elements 16, in this example tapered rollers, interposed between the outer ring 11 and the inner rings 12, 13, and for each series of tapered rollers 16, a cage 15 for keeping said tapered rollers 16 in their seats and in a position angularly equidistant from each other.

Each exemplary cage 15 includes for each tapered roller 16, a cavity 21 for containing the corresponding tapered roller 16, for each cavity 21, a separation crosspiece 22 parallel to the axis X and arranged between each cavity 21 and the immediately adjacent cavity 21, and two side edges 23 and 24 transverse to the axis X and integral with the associated crosspiece 22 and the crosspiece 22 of the adjacent cavity 21, the edge 23 of which is arranged axially on the inside of the edge 24 of the associated cage 15 and axially facing the edge 23 of the cage 15 of the other series of tapered rollers 16 defining an annular reservoir 25 which is substantially filled with lubricant, typically a grease based on mineral oil thickened with lithium soap, so as to ensure adequate lubrication during the operating condition of the bearing unit 10.

The bearing unit 10 further comprises a spacer 17 interposed axially between the inner rings 12, 13, and the outer ring 11, which in embodiments of the disclosure is designed to be stationary with the inner rings 12, 13 rotating, and is provided for each series of tapered rollers 16, with a respective conical raceway 11a axially tapered towards the inside of the said bearing unit 10, and with an annular groove 18, arranged in a position radially on the outside of the central spacer 17, namely in an axially intermediate position between the two raceways 11a, where the radial distance between the two raceways 11a and the central spacer 17 reaches the minimum value.

It must be remembered nevertheless that embodiments of the disclosure may in any case apply to the opposite case, namely to a bearing unit 10 with stationary inner rings 12, 13 and a rotating outer ring 11.

According to embodiments of the disclosure and in accordance with that also shown in FIG. 2, the bearing unit 10 furthermore comprises a grease dispensing device 30 which is housed inside the said bearing unit 10 in an intermediate position between the two series of tapered rollers 16 and comprises in turn an annular auxiliary reservoir 31 formed on the inside of the outer ring 11 extending from the annular groove 18, a radially outer cylindrical rim 32 mounted by means of snap engagement or pressure inside the groove 18 so as to act as a retaining wall for the reservoir 31 and delimit the reservoir 31 radially towards the inside and towards the axis X; and an annular flanged wall 33, which is perpendicular to the axis X and integral with the rim 32, from which it extends radially towards the axis X over a radial distance equal to an axial width L1 intercepted on both sides on the cylindrical rim 32 itself. The annular flanged wall 33 acts as a reinforcing partition of the cylindrical rim 32 and is arranged along the axial center line of the said cylindrical rim 32.

The cylindrical rim 32 and the annular wall 33 may be made of different materials, but preferably are made of plastic, and have thicknesses S1 and S2, respectively, which are substantially similar to each other so as to optimize their weight without adversely affecting their rigidity. The cylindrical rim 32 having an overall width L2, equal to substantially twice the axial width L1 intercepted by the annular flanged wall 33 on each side of the rim 32, wherein for the purpose of this disclosure substantially twice the axial width L1 includes the radial thickness S1 of the cylindrical rim 32. Moreover, the radial thickness S1 of the cylindrical rim 32 and its overall axial width L2, equal to substantially twice the axial width L1 intercepted by the annular flanged wall 33 on each side of the rim 32, match both a radial depth R of the groove 18 and an axial width L3 of said groove 18, not only in order to ensure perfect assembly, by means of snap engagement or pressure, of the device 30 inside the said groove 18, but also in order to limit as far as possible the radial and in particular axial dimensions of the dispensing device 30.

The flanged wall 33 extends radially towards the spacer 17 on the inside of the axial reservoir 25 defined by the two edges 23 of the cages 15, but the volume represented by this wall 33 inside the bearing unit 10 is decidedly small since its radial length, which, as mentioned above, is substantially equal to the axial width L1, allows it to radially overlap with said edges 23 of the cages 15, while its thickness S2 is such as to keep the flanged wall 33 axially spaced from both the edges 23.

In accordance with that further illustrated in detail in FIGS. 3 and 4, the grease dispensing device 30 comprises a plurality of through-holes 34 formed through the cylindrical rim 32 so as to make the rim 32 permeable and link, via the groove 18, the reservoir 25 with the auxiliary reservoir 31 which, at the start of the life cycle of the bearing unit 10, is also filled with the same lubricant with which the reservoir 25 is substantially filled. During the life cycle of the bearing unit 10, the grease present inside the reservoir 25 may migrate between the various parts of the bearing unit 10 in a substantially random manner and as a result of many factors, most of which cannot be controlled, making it necessary to carry out grease maintenance and replenishing operations. With the grease dispensing device 30 according to embodiments of the disclosure, not only is it possible to increase the quantity of grease present at the start of the life cycle of the bearing unit 10 with the amount contained inside the auxiliary reservoir 31, but the grease may also be retained inside the said reservoir 31 and allowed to flow out during operation of the bearing unit 10, dispensing it in the most controlled manner possible. Moreover, filling the reservoir 25 with an excessive amount of grease results in a consequent migration of the lubrication grease between the various parts of the bearing unit 10, which is even more random, as well as therefore an undesirable increase in the operating temperature of the bearing unit 10. Therefore, by adopting the reservoir 31, namely the device 10, it is possible to regulate even better the initially quantity of grease to be introduced into the bearing unit 10 at the start of its life cycle, thereby further prolonging said life cycle and maintaining an optimum working performance of said bearing unit 10.

For the purpose of regulating the dispensing action and depending both on the operating conditions of the bearing unit 10 and on the type of lubricating grease, the holes 34 may have different shapes and a different distribution along the rim 32.

In particular, in the preferred example of embodiment of the device 30 of embodiments of the disclosure, the holes 34 have a circular cross-section and, for each lateral portion 32a of the rim 32 defined by the wall 33, are uniformly distributed in two rows 35 axially spaced from each other by a distance smaller than a dimension of a diameter or an opening of the said holes 34, where the holes 34 of one row 35 are angularly spaced from the holes of the other row 35, and both rows 35 are more axially compacted towards the wall 33.

The axial distance between the two rows 35, as well as the dimension of the diameters of the holes 34, and also the possible form itself of the holes 34 may assume different shapes and forms and a different distribution, and also the rim 32 and the wall 33 may be made of different materials. According to an example of an embodiments of the disclosure, which is not shown, but which may be easily deduced from the description provided hitherto, for each part of the rim 32, there may also be two, three or more series of holes 34 and, with an increase in the series of holes 34, the dimensions thereof may also be reduced depending also on the grease which can be used with the dispensing device 10.

In any case, the function of the dispensing device 30 is that of retaining the grease inside it, namely inside the auxiliary reservoir 31 and allowing it to flow out through the rim 32, which acts as a permeable retaining wall, during operation of the bearing unit 10, dispensing it in the most controlled manner possible.

In the attached figures, the dispensing device is applied to a bearing unit with tapered rollers and is mounted in a central position between the two rows of tapered rollers, but it is understood that such a device according to embodiments of the disclosure could also be mounted laterally with respect to one or both the rows of tapered rollers.

Furthermore, although the dispensing device has been shown in combination with a tapered roller bearing, the same device, according to embodiments of the disclosure, may also be used with other different types of bearing, be they bearings with a single or double row of rolling elements, be they ball, roller or other types of rolling elements. More generally, it is understood that embodiments of the disclosure are not limited to the embodiments described and illustrated here, which are to be regarded as examples of the unit; persons skilled in the art may be able to make various changes to the functions and the configuration of the elements described in the example of embodiment, without thereby departing from the scope of the embodiments of the disclosure as defined in the accompanying claims and in the equivalents thereof.

What is claimed is:

1. A rolling bearing unit comprising:
a radially outer ring provided with an assembly groove;
two radially inner rings;
a series of rolling elements for each radially inner ring, interposed between the radially outer ring and the corresponding radially inner ring and defining with the other series of rolling elements a first internal grease reservoir; and
a grease dispensing device housed inside the groove of the radially outer ring, wherein the groove is arranged in an axially intermediate position with respect to the two radially inner rings and in that the dispensing device comprises:
a second internal grease reservoir formed on the inside of the radially outer ring and communicating with the first reservoir via the groove; and a permeable retaining wall housed inside the groove so as to retain the grease inside the second reservoir and allow it to flow out towards the first reservoir during operation of the bearing unit, dispensing it in a controlled manner;

wherein:

the permeable retaining wall is defined by a cylindrical rim housed inside the groove and has a plurality of through-flow elements having dimensions compatible with the characteristics of the grease inside the first and second reservoirs;

the through-flow elements are through-holes distributed along the cylindrical rim;

the cylindrical rim comprises a centre line dividing the cylindrical rim into two halves, and wherein the through-holes are uniformly distributed, over each half of the cylindrical rim, in at least two rows which are axially spaced from each other by a distance smaller than a dimension of an opening of said holes; and the dispensing device comprises an annular reinforcing partition arranged axially along the centre line of the permeable retaining wall.

2. The rolling bearing unit of claim 1, wherein the holes in one row are angularly spaced from the holes of the other row, both rows being more axially compacted towards the center line of the cylindrical rim such that the rows are closer to the center line of the cylindrical rim than axial edges of the cylindrical rim.

3. The rolling bearing unit of claim 1, wherein the thickness (S1) of the cylindrical rim and its overall axial width (L2) correspond to a radial depth (R) of the groove and, respectively, to an axial width (L3) of said groove both so as to ensure snap-engagement assembly of the device inside the groove and in order to limit the radial and in particular axial movement of the dispensing device.

4. The rolling bearing unit of claim 3, wherein the annular reinforcing partition extends radially inside the first reservoir which is axially delimited by two cages for retaining the series of rolling elements, wherein the annular reinforcing partition has a radial length substantially equal to half the axial width (L2) of the rim, wherein the annular reinforcing partition is configured to radially overlap with said cages and has an axial thickness (S2) such as to remain axially spaced from both the cages.

5. The rolling bearing unit of claim 4, wherein the series of rolling elements is two rows of tapered rollers, wherein the annular reinforcing partition is disposed between the two rows of tapered rollers.

6. The rolling bearing unit of claim 1, wherein the through-holes comprise a circular form.

* * * * *